Dec. 28, 1943.    G. WEINBERG    2,337,701
APPARATUS FOR MAKING CONTACT LENSES
Filed May 29, 1942
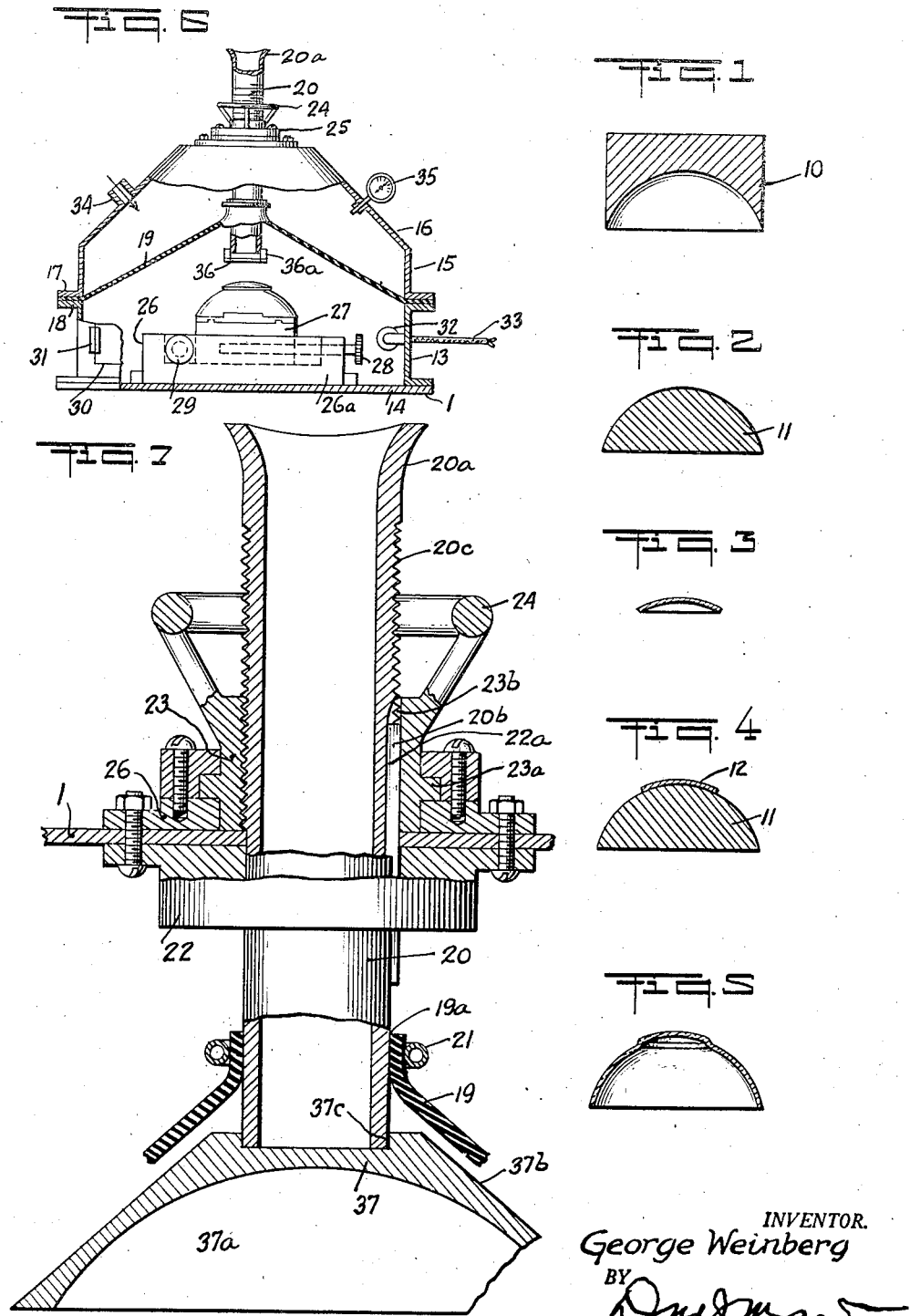
INVENTOR.
George Weinberg
BY
his ATTORNEY Patented Dec. 28, 1943

2,337,701

UNITED STATES PATENT OFFICE 2,337,701

APPARATUS FOR MAKING CONTACT LENSES

George Weinberg, Brooklyn, N. Y.

Application May 29, 1942, Serial No. 445,395

3 Claims. (Cl. 18—5)

This invention relates generally to ophthalmic lenses and is more particularly directed to a method and means of producing ophthalmic lenses of the so-called contact type of a plastic material.

As is well known, a contact lens must not touch certain sensitive parts of the eye, as the cornea and limbus, while at the same time, in order to avoid irritation and afford maximum comfort to the wearer, the lens should otherwise conform to the curvature of the insensitive sclera of the eye, including such aspherical or irregular curved surfaces, as may exist therein.

Various methods are now being practiced for forming contact lenses of plastic material, some of which involve taking an impression of the eye by applying a readily hardening plastic mass thereto to obtain a mold for producing a cast of the eye ball in plaster of Paris or other suitable material, upon which the lens is subsequently formed in different ways. To provide for limbus area of the eye, heretofore, it has been necessary to effect changes in the original plaster cast involving delicate and difficult operations, requiring a high type of skill for their execution, the lens being produced from the cast in its final form, by specially designed and more or less complicated mechanism, the whole procedure being an expensive one, so that the use of contact lenses is limited to a considerable extent. It has been proposed to eliminate some of the costly operations, as in preparing the cast, by utilizing special tools for hollowing it out in the area of the cornea and limbus, for producing a lens of the correct conformation. However, this does not materially reduce the cost of lens production and fails also to provide for variations in the shape and area of the cornea of different eyes, making it necessary to resort to hand modification of the cast or the stocking of a costly set of tools of different sizes, some of which may be rarely used.

Therefore, the primary object of this invention is to provide a simple and inexpensive method for producing a contact type of ophthalmic lens of infrangible plastic material, that will accurately conform to the individual eye, the area of tolerance between the lens and the corneal limbus area of the eye being readily varied to meet different eye characteristics, so that a maximum of visual acuity may be attained with complete comfort to the wearer, in all cases.

It is also an important object of this invention to provide an apparatus for producing an ophthalmic plastic lens having the aforesaid characteristics, whereby a lens may be readily produced by the general practitioner in optometry and ophthalmogy, thus materially reducing the cost of production and of the ultimate product to the consumer.

Another object of my invention is to provide an apparatus as aforesaid, by means of which a lens may be produced which will exactly suit the eye for which it is intended, not only with respect to the corneal limbus area of the organ, but in the marginal zone of the insensitive sclera thereof, essential adjustments to assume correct optical and physical fit being readily accomplished without the use of special tools, as at present.

My invention is also directed to a plastic ophthalmic lens of the contact type, which may be accurately conformed to the contour of an individual eye, including aspherical curvatures that may exist therein, to insure a most intimate fit of the completed lens, to eliminate a potential source of irritation to the organ and the resultant discomfort to the wearer, that is a concomitant of poorly conformed lenses, as are often produced by the inexpert use of existing methods.

Other objects and advantages flowing from the practicing of my method will become manifest as the description proceeds and I would have it understood that I reserve unto myself all rights to the full range of equivalents to which I may be entitled under my invention, as defined by the appended claims.

In the accompanying drawing, I have shown the molds and casts that I employ, together with a preferred and highly practical form of apparatus for practicing my method in a simple and most efficient manner. However, the apparatus may take other forms and the details of the structure shown may be varied to meet special requirements of production and use, within the spirit of this disclosure.

In the drawing:

Figure 1 is a vertical sectional view of the plastic mold, produced in the initial step of my method, directly from the eye.

Figure 2 shows a plaster cast, as produced in cooperative association with the mold of Figure 1.

Figure 3 is a view in perspective of a spacer which I utilize in conjunction with the cast for providing the necessary clearance between the completed lens and the cornea of the eye.

Figure 4 is a longitudinal sectional view of the plaster cast, with the spacer superimposed thereon, preliminary to the production of the plastic lens.

Figure 5 is a sectional elevation of a completed plastic contact lens, as removed from the cast and cooperating spacer shown in the preceding figure.

Figure 6 is a sectional elevation of a form of apparatus for carrying my method into effect; and Figure 7 is an enlarged sectional elevation of the observation tube of the apparatus, which also functions to engage and maintain the cast and cooperating spacer in position for the performance of the lens producing operation within the apparatus.

Referring now to the drawing in detail, in which like characters of reference are employed to designate similar parts in the several views, 10 indicates a negative mold composed of a readily hardening plastic as "Negacoll" or "Dentacoll" which is obtained by applying the plastic mass directly to the eye, in accordance with standard practice, a positive cast of plaster of Paris or other suitable material being produced therefrom, in the conventional manner.

When the cast 11 has hardened, the appropriate spacer, preferably in the form of a metal cap 12, having a convex external surface and an internal concave surface, is centered upon the convex surface of the cast, as hereinafter explained, for the production of the plastic lens therefrom under heat and pressure in the apparatus, which I have devised for practicing my method.

As shown in the drawing, this apparatus embodies a housing, preferably comprising an upper and a lower section, the lower section having a cylindrical wall 13, surmounting a base 14, the cylindrical wall 15 of the upper section merging into a wall of a truncated conical configuration, as indicated at 16. The two sections are interlocked to form a unitary structure, by means of the complemental flanges 17 and 18, the lower section defining a heating chamber while the upper section constitutes a pressure chamber, a diaphragm or membrane of a heat and oilproof elastic rubber substitute, as "neoprene," as indicated at 19, being interposed between the aforesaid flanges to form the dividing partition between the two chambers. This diaphragm is centrally apertured, as at 19a, to frictionally engage the tube 20, to which it is firmly clamped by a retaining ring 21 in the formation of an hermetic jointure with the tube periphery.

The tube 20, the outer end of which is conformed to provide an eye-piece 20a, is vertically reciprocable in the bearing 22, provided at the top of the housing, the said bearing embodying a longitudinal guideway 22a for the reception of the spline or key 20b formed on the circumference of the tube. Movement of the tube is accomplished in response to the actuation of the collar 23 by means of ring 24 fixed thereto, the collar having a flange 23a rotatable within the cooperating bearing-forming elements 25 and 26, fixed to the top of the housing and being internally threaded, as at 23b to mesh with the complemental threads 20c on said tube, as clearly shown in Figure 7 of the drawing.

A part of the wall of the lower section of the housing is interrupted to form an opening to afford access to the lower chamber of the apparatus, in which is mounted a platform 26 supporting a stage 27 for relative movement thereon, suitable screws being provided for manually adjusting the stage longitudinally and transversely of the platform, as shown at 28 and 29, for accurately centering a cast disposed upon the stage, preliminary to the formation of the lens, as hereinafter set forth. If desired, a drawer may be incorporated in the platform structure, as at 26a, for storing casts and spacers when not in use, a door 30, hinged to the housing wall, as at 31, being provided to seal the heat chamber when the apparatus is in operation. Heat may be introduced to the lower chamber, the wall of which is insulated in any suitable manner, although it is preferred to employ electrical heating elements 32 mounted within the chamber and connectable to a suitable source of energy by the lead 33, the temperature being controlled by a thermostat (not shown) within the heating chamber.

A connection 34 is provided in the top of the housing for introducing a fluid to the pressure chamber, from any suitable source of supply, as a pump (not shown) or the like, a gauge 35 communicating with the chamber, serving to visibly indicate the pressure therein, when the apparatus is functioning.

In producing a lens, the positive plaster cast 11, to which the spacer or cap 12 centered thereon has been previously fixed by an adhesive is placed upon the stage and secured thereto by any suitable clamping or other fastening means, through the opening in the wall of the heating chamber. A framing device 36, embodying the usual crossed centering hairs interposed between sheets of transparent material, is then applied to the dependent end of the tube 20, the framing device, preferably, being formed with a flexible or resilient attaching flange, as at 36a, whereby it may be readily positioned in functioning position upon the end of the tube.

In centering the spacer cap 12 upon the cast 11, the exact center of the cast is marked upon the external surface of the former, so that by the proper manipulation of the stage 27 upon which the capped cast is mounted, by means of the adjusting screws 28 and 29, the cast assembly or so-called positive internal mold, may be accurately centered for the performance of the ensuing steps of my method, it being obvious that the cast assembly is viewed through the tube for centering in registration with the point of intersection of the crossed hair lines in the framing device.

The framing device is now removed from the tube 20 and a metal mold, preferably of the composition of the cap 12 is substituted therefor. This mold 37 presents a concave surface 37a, the radius of the curvature of which is predetermined according to the optical correction that is required in the finished lens and conforms generally to the curvature of the convex surface of the spacer cap 12 centered upon the plaster cast, with which it is, in effect, matable, in the manner of a male and female die assembly. The outer periphery of the mold is of a truncated conical contour, as at 37b, the top being recessed or undercut to provide an annular seat 37c in which the end of the tube 20 is entered in frictional engagement with the defining wall thereof, the tolerance between the opposed annular surfaces providing for a so-called force-fit location of the mold upon the tube, by pressing it upwardly thereagainst by hand. Of course, if desired, the mold may be connected to the tube by a spring collar or other suitable means.

A sheet of plastic material, as "Plexiglas" or "Lucite" for example, is next superimposed upon the cast assembly for the formation of the lens therefrom, the tube 20 being then lowered by means of the ring 24, to urge the mold 37 into position relative to the cap 12, under sufficient pressure to prevent shifting of the interposed plastic sheet material, relatively to the opposed surfaces of the mold and cast assembly.

The lower chamber is now sealed by means of the closure 30 and the heating elements energized to attain a temperature of approximately 250° F. which is maintained for a sufficient interval to produce a softening of the plastic material for the performance of the lens-forming step of my method. This involves the shaping of the softened plastic under pressure, a fluid, which may be oil, being admitted to the pressure chamber through the inlet 34 to expand the diaphragm 19 and press it downwardly into close association with the softened plastic to cause it to conform to the exposed portion of the positive cast 11, throughout the area thereof which surrounds the defining edge of the mold 37, the plastic within the area of the mold 37 and the cooperating spacer-cap 12 being conformed to the requisite curvatures under pressure induced by the further downward adjustment of the tube 20, in the manner previously described. In order to maintain the correct temperature within the heating chamber, so that the plastic will not become semifluid, a thermostat (not shown) may be provided, that may be set for the required 250° F. or such other operating temperature as may be desired.

When the plastic has been subjected to the conforming pressure as just described, the heating of the chamber is discontinued and the plastic is permitted to cool, the pressure being maintained during the cooling period. When completely cooled, the pressure fluid is discharged from the upper chamber and the plastic is relieved of the tube-induced pressure, so that it may be removed from the apparatus, the resulting product constituting a lens having the essential clearance between its inner surface and the corneal limbus area of the eye, in which the outside corneal section is generally conformed for the necessary optical correction, the sclera-engaging portion of the lens conforming exactly to the contours of the cast 11 which is a replica of the sclera of the eye for which the lens is designed.

It will be understood that any required number of molds 37 and spacer caps 12 of different sizes may be maintained by the practitioner to provide for the production of lenses of various optical characteristics and cornea clearance dimensions. Also, contact lenses of every type may be made in accordance with my invention, as tinted, prismatic or toric correction lenses, multi-focal and telescopic lenses, it being manifest from the foregoing that a lens produced by the use of my apparatus, may be made in the exact dimensions required, by the use of a preformed plastic blank, or where predetermined lens dimensions may not be available, the edge of the lens may be easily trimmed and polished for immediate insertion in the eye.

I claim:

1. An apparatus for producing a plastic ophthalmic lens of the contact type, comprising a housing, a diaphragm supported therefrom to divide said housing into an upper pressure chamber and a lower heating chamber, a mold for producing the internal contour of a lens, adjustable means within said heating chamber for supporting said mold, a tubular element superposed above said mold-supporting means for vertical reciprocation, means connected to said tubular element for imparting a predetermined external contour to a lens in a central area thereof, means for actuating said element toward said mold-supporting means to exert frictional pressure upon a sheet of plastic interposed between the mold on said mold-supporting means and the means for imparting an external contour to a lens carried by said tube, means for heating said lower chamber to soften the plastic material retained under pressure of said reciprocable means and means for admitting a pressure fluid to the upper chamber of said housing to produce therein pressure reacting to press said diaphragm into contact with such plastic material retained under pressure of said reciprocable means, as aforesaid, in an area surrounding the contour producing means carried thereby, said diaphragm conforming to the contour of the supporting surface of such area of the plastic material.

2. An apparatus for producing a plastic ophthalmic lens of the contact type, comprising a housing embodying an upper pressure chamber and a lower heating chamber, a diaphragm coextensive in said housing associated therewith, to form a dividing wall between said two chambers, a mold for producing the internal contour of a lens, adjustable means within said lower chamber formed for the reception of said mold, a tubular element mounted in said housing above said mold-receiving means for vertical reciprocation, rotatable means external of said housing for actuating said tubular element toward and from said mold-receiving means, means for forming the external contour of a lens in a central zone thereof connected to one end of said tubular element, and adapted to cooperate with the mold on said mold-receiving means, in response to the actuation of said tubular element toward said mold-receiving means to frictionally retain a sheet of plastic material interposed between said external contour forming means and a central portion of said mold, means for heating said lower chamber to a temperature to soften such frictionally retained plastic sheet and means for admitting a pressure fluid to said upper chamber to produce a movement of said diaphragm into contact with the plastic overlying the portion of said mold surrounding the aforesaid central zone of retention of the plastic sheet, the continued application of pressure to said diaphragm causing the plastic to conform to the contour of such portion of the mold in response to the conformation of the diaphragm thereto in contact with the plastic material.

3. An apparatus for producing a plastic ophthalmic lens of the contact type, comprising a housing containing a diaphragm of an area coextensive with the area of the housing associated therewith to form a partition dividing said housing into an upper pressure chamber and a lower heating chamber, a mold for producing the internal contour of a lens, a stage formed for the reception of said mold mounted in said lower chamber, a tubular element mounted in said housing above said stage for vertical reciprocation, means for adjusting said stage beneath said element to center a mold thereon concentric with the axis of said superposed tubular element, means rotatable externally of said housing for actuating said tubular element toward and from said stage, a second mold for forming the external contour of a lens in a central zone thereof detachably connectable to the lower end of said element adapted to coact with the mold positioned upon said stage to engage and frictionally retain a sheet of plastic material interposed between the opposed surfaces of said external and internal contour producing molds in response to the actuation of said tubular element toward said stage, means for electrically heating said lower chamber to a temperature effective to soften the plastic sheet retained between the opposed surfaces of the two molds and means for admitting a pressure fluid to said upper chamber to produce an expansion of said diaphragm outside the area of said tube to cause said diaphragm to contact with the plastic material disposed around the external contour producing mold and in consequence cause it to conform to the surface of the internal contour-forming mold surrounding the marginal edge of said external contour-producing mold, in response to a conforming movement of said diaphragm thereto in contact with the plastic material, said tubular element being further operable to urge the mold carried thereby toward the opposed surface of the internal contour-forming mold for shaping the portion of the plastic material interposed therebetween to produce a lens having predetermined optical characteristics and a predetermined clearance between the inner surface thereof and the corneal limbus area of the eye to which it is to be fitted.

GEORGE WEINBERG.